Sept. 28, 1965   J. D. COSCIONE ETAL   3,208,791
DUAL PIVOT VENT WINDOW

Filed Sept. 13, 1963   4 Sheets-Sheet 1

INVENTORS
JOSEPH D. COSCIONE
WALTER J. BILINSKI
BY
John R. Faulkner
Jerry D. Beck
ATTORNEYS Sept. 28, 1965   J. D. COSCIONE ETAL   3,208,791
DUAL PIVOT VENT WINDOW
Filed Sept. 13, 1963   4 Sheets-Sheet 2
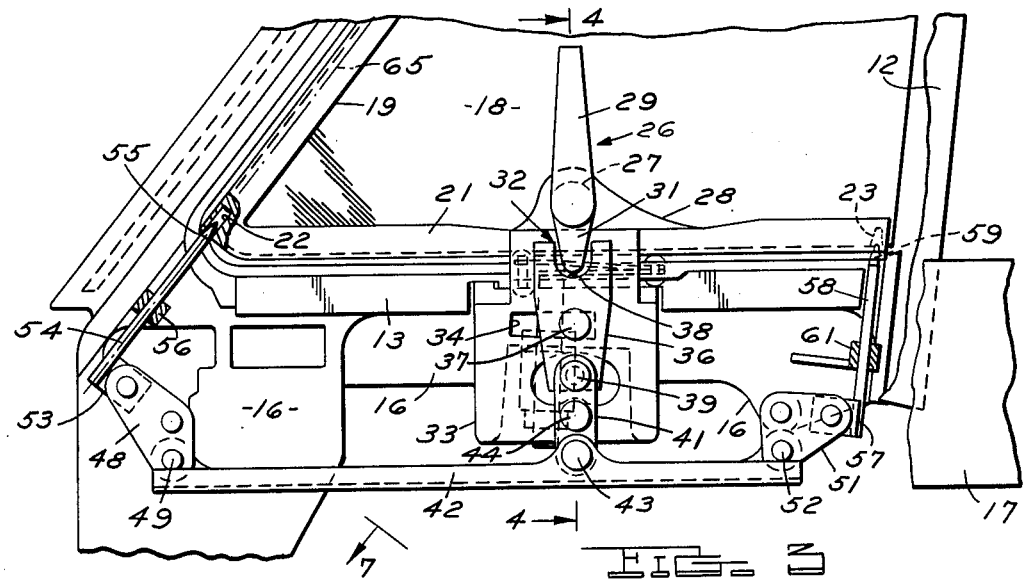
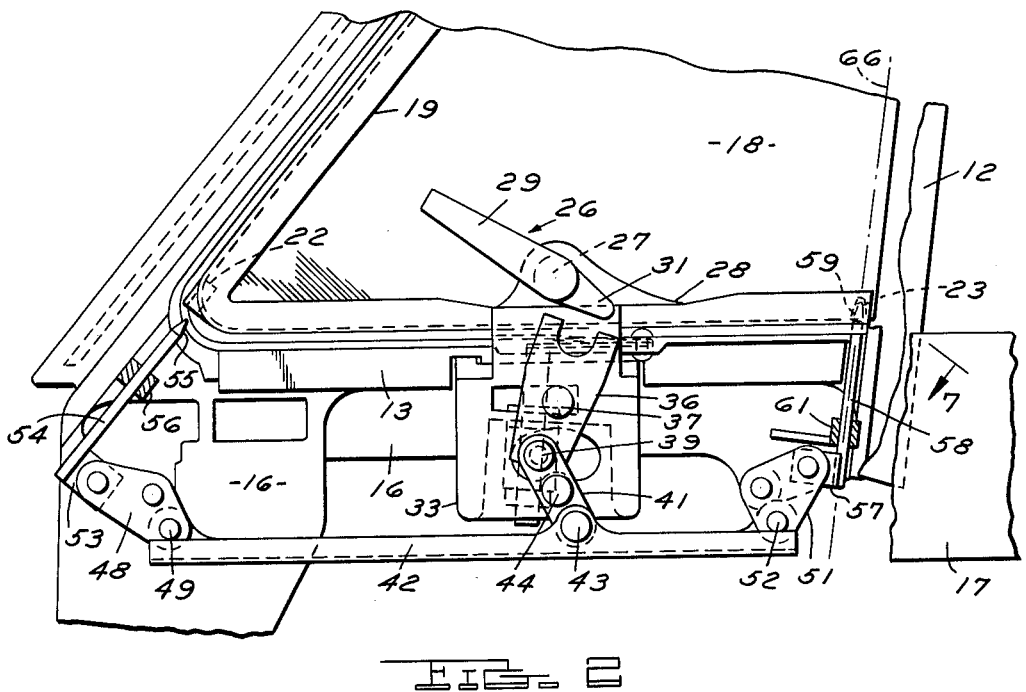
JOSEPH D. COSCIONE
WALTER J. BILINSKI
INVENTORS
BY John R. Faulkner
Jerry D. Beck
ATTORNEYS Sept. 28, 1965  J. D. COSCIONE ETAL  3,208,791
DUAL PIVOT VENT WINDOW
Filed Sept. 13, 1963  4 Sheets-Sheet 3
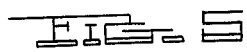
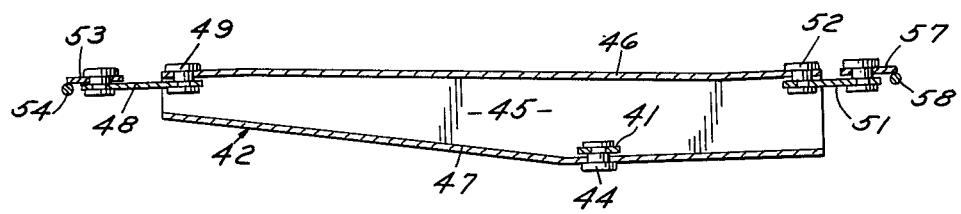
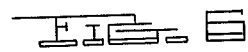
JOSEPH D. COSCIONE
WALTER J. BILINSKI
INVENTORS
BY John R. Faulkner
Jerry D. Beck
ATTORNEYS Sept. 28, 1965   J. D. COSCIONE ETAL   3,208,791
DUAL PIVOT VENT WINDOW
Filed Sept. 13, 1963   4 Sheets-Sheet 4
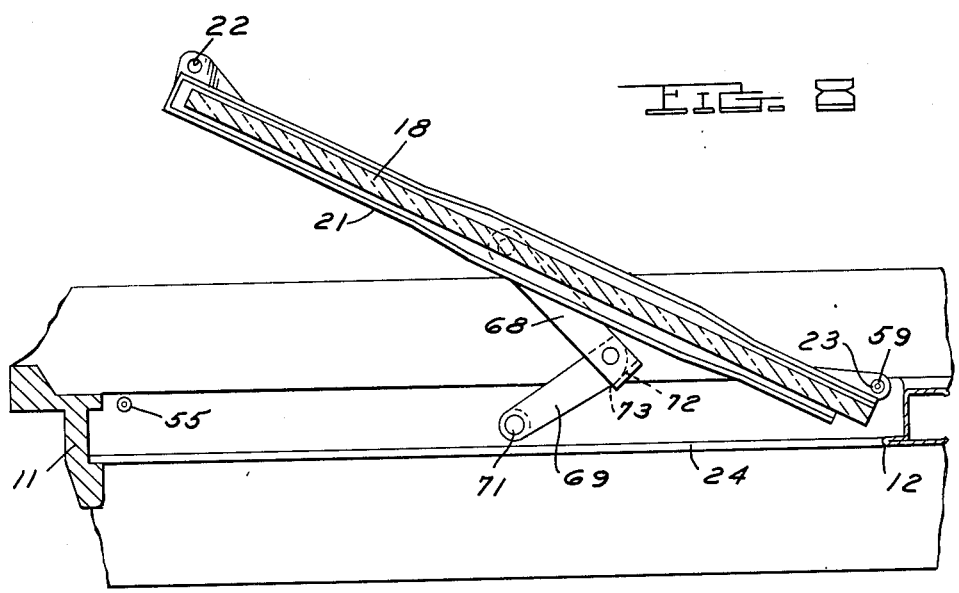
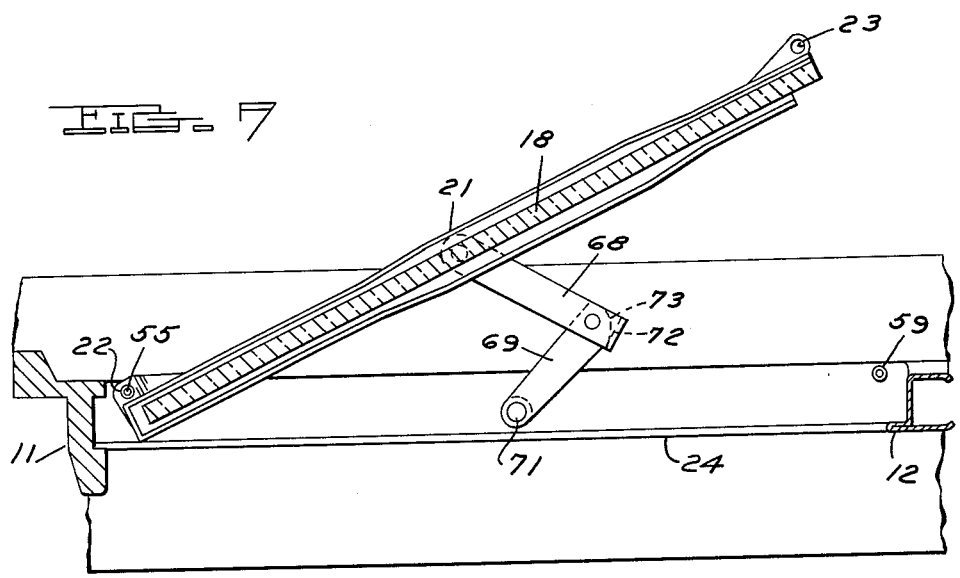
JOSEPH D. COSCIONE
WALTER J. BILINSKI
INVENTORS
BY John R. Faulkner
Jerry D. Beck
ATTORNEYS

United States Patent Office 3,208,791
Patented Sept. 28, 1965

3,208,791
DUAL PIVOT VENT WINDOW
Joseph D. Coscione, St. Clair Shores, and Walter J. Bilinski, Dearborn, Mich., assignors to Ford Motor Company, Dearborn, Mich., a corporation of Delaware
Filed Sept. 13, 1963, Ser. No. 308,728
5 Claims. (Cl. 296—44)

This invention relates to ventilation or "vent" windows for vehicle bodies and more particularly to vent windows mounted on dual pivots for selective swinging movement to either an air intake or air exhaust position on the exterior side of a window opening in a motor vehicle.

Presently, most motor vehicles are provided with vent window assemblies of a type having a glass panel that is swingable to an opened and closed position about a single fixed pivotal axis located intermediate the ends of the panel. When the rearward facing edge of the glass panel is swung outwardly of the window, the forward edge of the panel swings inwardly to allow for the exhaust of air from the interior of the vehicle body. When the glass panel is swung more than 90° so that the normally rearwardly facing edge faces forwardly, the panel intercepts the stream of air flowing by the vehicle body to provide for intake ventilation for the occupants of the vehicle.

As the conventional vent glass panel is swung about its pivotal axis, the glass panel has to cross the weather stripping installed around the vent window opening. Weather stripping designed to accommodate such crossover of the glass panel is subject to excessive deflection and wear and will not provide a proper tight seal at this crossover point after extended use of the vent window.

The conventional vent window even in the partially opened exhaust position has a portion which projects into the passenger compartment. This portion provides a path for rain water flow. Unless a rain guard is provided, it is usually necessary to maintain the vent windows in a closed position during inclement weather or rain to prevent water from dripping onto the passenger or driver sitting adjacent the front windows.

This invention overcomes some of these disadvantages by providing a vent window mounting structure that results in the entire glass panel extending angularly outwardly of the vehicle body when swung to an opened position either for air exhaust or air intake purposes.

In a preferred embodiment of this invention, the vent window is substantially triangular in shape and has its apex attached to the vehicle body window frame by a coupling means. A first pivot pin and a second pivot pin longitudinally spaced from said first pivot pin are retractably mounted on the vehicle body. The first or second pivot pins when in an extended position pivotally connect an edge of the vent window opposite its apex to the vehicle body. A manually movable control member is provided on the vent window and is operatively connected to the first and second pivot pins by an actuating linkage. Rotational movement of the control member either extends the first pivot pin and retracts the second pivot pin or retracts the first pivot pin and extends the second pivot pin to allow for the swinging movement of the vent window about a first axis or a second axis extending through the extended pivot pin and the coupling means.

If the vent window is swung from its closed position about the first axis, it will be placed in an exhaust opened position. Or if the vent window is swung about the second axis, it will be placed in an intake opened position. In either position, the window will extend outwardly from the vehicle body without having any portion of the vent window projecting within the passenger compartment.

The manual control member may also be rotated to a neutral position to cause partial engagement of the first and second pivot pins with the closed vent window to maintain the latter in a securely locked position.

Accordingly, it is an object of this invention to improve the ventilation of vehicle bodies by providing a vent window which can be manually moved to either an intake or exhaust opened position about selective pivot axes with the entire glass panel extending outwardly of the vehicle body in either position.

It is a further object of this invention to provide a vent window which is movable to either an intake or exhaust position about selective pivot axes without crossing over the weather stripping encompassing the window opening.

A still further object of this invention is to provide a control means on the inside of the vehicle body which can be actuated by an occupant thereof to permit the manual movement of the vent window from a closed position to either an intake or an exhaust opened position or to lock the vent window securely in its closed position.

Other objects and features of the present invention will become more apparent as this description proceeds, particularly when considered in connection with the accompanying drawings, wherein:

FIGURE 2 is a view in part similar to FIGURE 1 but illustrating the vent window mechanism arranged to permit air intake ventilation;

FIGURE 3 is a partial side view of a closed vent window of FIGURE 1 with the vent window mechanism shown in a neutral position to lock the window;

FIGURE 4 is a sectional view through the vent window mechanism control member and its associated actuating means taken along line 4—4 of FIGURE 3;

FIGURE 5 is a sectional view of an element of the actuating means taken along line 5—5 of FIGURE 1;

FIGURE 6 is a sectional view of a nondisengageable coupling element for the vent window taken along line 6—6 of FIGURE 1;

FIGURE 7 is a sectional view of the vent window taken along line 7—7 of FIGURE 2 but shown when the vent window is swung to an air intake position; and, FIGURE 8 is a sectional view of the vent window taken along line 8—8 of FIGURE 1 but shown when the vent window is swung to an air exhaust position.

Figure 1:
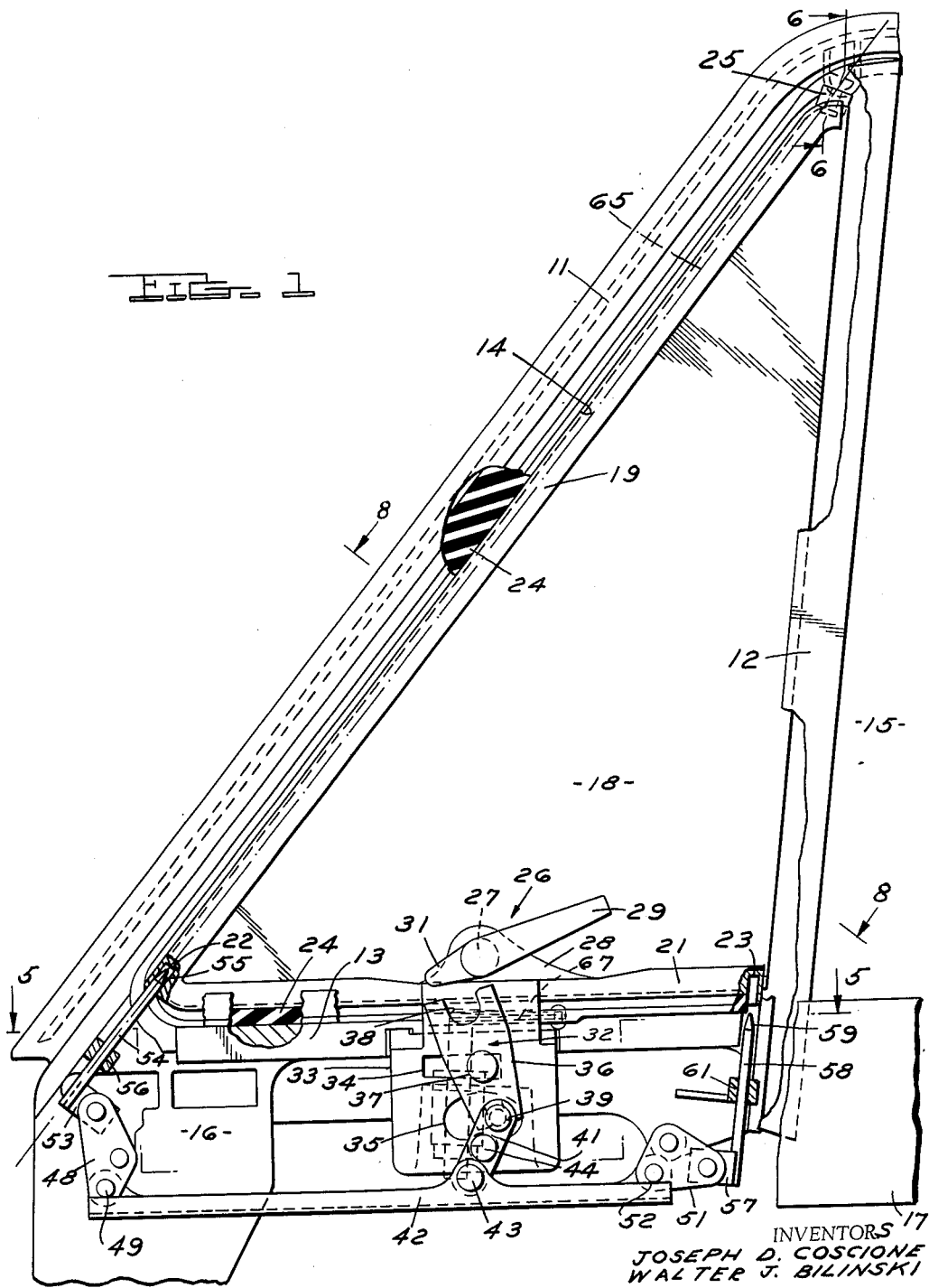
FIGURE 1 is a side elevational view, partially broken away and in section, of a portion of a motor vehicle body incorporating the vent window mechanism of the present invention with the mechanism arranged to permit air exhaust ventilation.

Referring now to the drawings, especially to FIGURE 1, there is seen a diagonal window frame member 11, a vertical window frame member 12, and a lower longitudinally disposed window frame member 13 defining in part a triangular vent window opening 14 in juxtaposition to a front window opening 15 in a wall of a vehicle body. Only a small portion of a vehicle body structure 16 adjacent the vent window opening 14 is shown. A garnish molding 17 serving as a decorative trim strip covers the interior facing surface of the lower longitudinally disposed window frame member 13. The garnish molding 17 is shown partially cut away to depict the vehicle body structure 16 housing a linkage control means for the vent window which is discussed in greater detail hereinafter.

A triangular-shaped vent window glass panel 18 is mounted in the vent window opening 14. The glass panel 18 when in a closed position has a diagonally extending forward facing edge in a contiguous relationship to the window frame member 11, a rearward facing vertically disposed edge contiguous to the frame member 12, and a bottom edge contiguous to the garnish molding 17. A first channel member 19 is attached to the forward edge of the glass panel 18 and a second channel member 21 is secured to the bottom edge thereof. The second channel member 21 has a diagonally inwardly extending socket 22 at the forward end and a generally vertically disposed socket 23 at the rearward end.

A weather strip 24 may be positioned in or adjacent to the frame members 11 and 12 to provide a seal between said frame members and the contiguous channel members surrounding the glass panel 18 when the latter is in a closed position. A hollow pear-shaped coupling element 25, which is integrally formed with the upper portion of the frame member 11, extends downwardly therefrom to universally connect the apex of the channel member 19 of the vent window glass panel 18 to the frame member 11 as will be hereinafter described in greater detail.

A rotatable control member 26 has its center portion pivotally connected by a pivot pin 27 to a mounting flange 28 integrally formed with the channel member 21 intermediate the sockets 22 and 23. The control member 26 has a handle portion 29 and a cam portion 31 extending in opposite directions from the pivot pin 27.

In FIGURES 1 through 4 is seen an actuating means 32 that is actuated upon rotation of the control member 26 and is housed in the portion of the vehicle body structure 16 enclosed by the garnish molding 17. The actuating means 32 comprises a flat support plate 33 that is securely attached to the lower window frame member 13. This support plate 33 has a longitudinally extending upper slot 34 and a bean-shaped lower slot 35. An actuating element 36 is pivotally connected to the support plate 33 by a rivet 37 which has its shank portion extending through the upper slot 34. The upper end of the actuating element 36 has a cam portion engageable means 38, while the lower end thereof is pivotally connected by a pivot pin 39 to the upper portion of a coupling link 41. The head of the rivet 37 extends into the lower slot 35 of the support plate 33. The lower portion of the coupling link 41 is connected to a longitudinally extending driving link 42 intermediate its ends by a rivet 43. The center portion of the coupling link 41 in turn is pivotally attached to the support plate 33 by a pivot pin 44.

As best seen in FIGURE 5, the driving link 42 is of a generally channel-shaped configuration having a base 45 in a horizontal plane and a straight, vertically extending, first leg 46 and a bent, vertically extending, second leg 47 extending upwardly from opposite sides of the base 45. The pivot pin 44 attaches the coupling link 41 to the second leg 47 of the driving link 42.

A triangular-shaped first bell crank member 48 is pivotally connected by pivot pin 49 to the first leg 46 at the forward end of the driving link 42. A second triangular-shaped bell crank member 51 also is pivotally connected by a pivot pin 52 to the first leg 46 but at the rearward end of the driving link 42 as best seen in FIGURE 5. It can be noted that the two pivot pins 49 and 52 are spaced outwardly, and longitudinally forwardly and longitudinally rearwardly, respectively, from the pivot pin 44 when looking down on the driving link 42.

In FIGURES 1 through 3 it can be seen that the first bell crank member 48 has one end coupled to the vehicle body structure 16 while the remaining two swingable ends thereof are pivotally connected to a plate 53 and to the forward end of the driving link 42, respectively. A first shiftable pivot pin 54 is attached to the plate 53. This pin 54 has an upwardly projecting pointed tip portion 55 that is received between two supports 56 so as to guide the tip portion 55 in a diagonally upward direction upon being shifted or extended.

The second bell crank member 51 has one end coupled to the vehicle body structure 16, while the remaining two swingable ends are pivotally connected to a second plate 57 and the rearward end of the driving link 42. A second shiftable pivot pin 58 carried by the plate 57 also has a pointed tip portion 59 which is guided by supports 61 so as to project in a generally vertical direction when in a shifted or extended position. The supports 56 and 61 assure that the axial movements of the first and second shiftable pins 54 and 58 are in alignment with the center axis of sockets 22 and 23, respectively.

As seen in FIGURE 6, the upper portion of channel member 19 has a bushing support 62 through which a pivotable, semispherical element 63 extends. This semispherical element 63 is received in the pear-shaped coupling element 25 to form a non-disengageable, universal connection 64 between the vent window glass panel 18 and the frame member 11 attached to the vehicle body.

The operation of the vent window mechanism to permit the vent window panel 18 to be swung to either an intake or an exhaust opened position from a closed position may be described as follows:

Referring to FIGURE 3 which shows the vent window in a locked position, when the handle portion 29 of the control member 26 is rotated in a clockwise direction, the cam portion 31 will engage the cam portion engageable means 38 of the actuating element 36 to cause the latter to be rotated in a counterclockwise direction. The counterclockwise rotation of the actuating element 36 will result in the forward longitudinal movement of the driving link 42 through swinging movement of the coupling link 41.

As the first bell crank member 48 and the second bell crank member 51 are pivotally connected to the vehicle body structure 16, the forward movement of the driving link 42 will result in the first shiftable pin 54 being extended from its retracted position so that its tip portion 55 enters the socket 22 in the channel member 21 as seen in FIGURE 1.

The second bell crank member 51 will also be rotated in a clockwise direction to retract the extended pointed tip portion 59 of the second shiftable pin 58 from the socket 23 in the rearward portion of the channel member 21. It can be seen that a first pivotal axis 65 is effected which extends through the non-disengageable universal connection 64 and the center axis of the extended first shiftable pin 54 and the socket 22. Then, as rotation of the handle portion 29 is continued in a clockwise direction, the cam portion 31 will be disengaged from the now angularly disposed actuating element 36 to clear the lower window frame 13. As the cam portion 31 of the control member 26 clears the actuating means 32 and the garnish molding 17, the vent window glass panel 18 may now be manually swung about this first pivotal axis 65 to an exhaust opened position from its closed position as best seen in FIGURE 7.

To swing the vent window glass panel 18 to an air intake opened position from its closed position, the handle portion 29 of the control member 26 must be manually rotated in a counterclockwise direction from its FIGURE 3 position. This initial rotation causes the cam portion 31 to engage the cam portion engageable means 38 and thereby swing the actuating element 36 in a clockwise direction as seen in FIGURE 3. The swinging movement of the actuating element 36 causes the driving link 42 to move in a longitudinal rearward direction through the action of the coupling link 41 interconnecting the actuating element 36 with the driving link 42.

Further rotational movement of the handle portion 29 will result in the disengagement of the cam portion 31 from the cam portion engageable means 38 to permit the cam portion 31 to clear the lower window frame member 11.

The rearward movement of the driving link 42 causes the first bell crank member 48 to rtotate in a counterclockwise direction to effect the retraction of the extended tip portion 55 of the first shiftable pivot pin 54 from the socket 22 in the channel member 19. Simultaneously, the second bell crank member 51 is rotated to shift the second shiftable pin 58 in a generally vertical direction so that its pointed tip portion 59 extends into the socket 23 of the channel member 19. Thus, a second pivotal axis 66, see FIGURE 2, is effected which extends through the nondisengageable universal connection 64 and the center axis of the extended second shiftable pin 58 and the socket 23. This permits the manual pivotal movement of the vent window glass panel 18 about the second pivotal axis 66 to an intake opened position from its closed position as the forward edge of the glass panel 18 is not engaged by the tip portion 55 of the first shiftable pivot pin 54 as best seen in FIGURE 8.

When the vent window glass panel 18 is in a closed position and the handle portion 29 of the control member 26 is moved to a neutral or vertical position as seen in FIGURE 3, the cam portion 31 remains in engagement with the cam portion engageable means 38 of the actuating element 36. This maintains the driving link 42 centered, resulting in the partial engagement of the tip portions 55 and 59 with sockets 22 and 23 respectively. The channel member 21 is now maintained in a fixed position with respect to the lower window frame member 13 by the tip portions 55 and 59 extending into the sockets 22 and 23. This will securely lock the vent window glass panel 18 in its closed position.

To control the maximum angular position of the opened vent window glass panel 18, a toggle linkage 67 may be provided. The linkage 67 comprises an upper link 68 and a lower link 69, each of which has one end pivotally interconnected to each other. The other end of the upper link 68 is pivotally attached to the center of the channel member 21, while the other end of the lower link 69 is pivotally connected to the lower window frame member 13 by a pivot pin 71 extending through a portion of the weather strip 24 as best seen in FIGURE 4. The upper link 68 and the lower link 69 are horizontally disposed in an overlapping relationship when the vent window glass panel 18 is in a closed position as best seen in FIGURE 4.

As the vent window glass panel 18 is swung to either an intake or exhaust opened position, the overlapping interconnected upper link 68 and lower link 69 are angularly displaced to each other. The upper link 68 has a downwardly extending flange 72 at its one end that abuts an edge 73 of the lower link 69 to provide a stop for the vent window glass panel 18 when it is swung to either its maximum exhaust opened position as seen in FIGURE 7 or its maximum intake opened position as seen in FIGURE 8.

The embodiment of the dual pivot vent window described and illustrated is mounted on the passenger side of the front seat of the vehicle body, but it is to be understood that the mounting of a vent window on the driver's side of the vehicle would be similar with movement of the control member being in a direction opposite from what is depicted to achieve the same results.

It can be readily understood that this invention provides a vehicle ventilation window having a triangular glass panel 18 that can be swung to either a maximum intake opened position or a maximum exhaust opened position about the first pivotal axis 65 or the second pivotal axis 66 respectively. The occupant of the vehicle may select the opened position desired by rotating the handle portion 29 of the control member 26 in either a clockwise or counterclockwise direction when the glass panel 18 is in a closed position. Rotation in one direction will make the first pivotal axis 65 operative and rotation in an opposite direction will make the second pivotal axis 66 operative. Movement of the handle portion 29 to a vertical or neutral position will result in the secure locking of the vent window glass panel 18 in its closed position.

It will be further understood that this invention is not to be limited to the exact construction described but that various changes and modifications may be made without departing from the spirit and scope of the invention as defined in the appended claims.

We claim:

1. A vehicle body having a window frame in a wall thereof, a ventilation window mounted in said window frame and adapted to be swingable from a closed position to an opened position, connecting means mounted on said window frame for universally connecting one portion of said window to said vehicle body, a movable first pivot retractably mounted in said vehicle body and adapted to pivotally connect a second portion of said window to said window frame when said first pivot is moved to an extended position, a movable second pivot retractably mounted in said vehicle body and adapted to pivotally connect a third portion of said window to said window frame when said second pivot is moved to an extended position, a control member selectively rotatable in clockwise and counterclockwise directions and mounted on said window, and linkage means in said vehicle body operatively connected to said first and second pivots, said control member when rotated in a clockwise direction when said window is in a closed position actuating said linkage means to extend said first pivot and to retract said second pivot to allow for swinging movement of said window from its closed position to an opened position about an axis extending through said connecting means and said first pivot, said control member when rotated in a counterclockwise direction and when said window is in a closed position actuating said linkage means to retract said first pivot and to extend said second pivot to allow for swinging movement of said window from its closed position to an opened position about an axis extending through said connecting means and said second pivot.

2. A vehicle body having a window frame in a wall thereof, a ventilation window mounted in said frame and adapted to be swingable from a closed position to an opened position with the entire window extending angularly outwardly of said vehicle body, connecting means mounted on said window frame for universally connecting one portion of said window to said frame, a movable first pivot retractably mounted in said body and adapted to pivotally connect a second portion of said window to said window frame when said first pivot is moved to an extended position, a movable second pivot pin retractably mounted in said vehicle body and adapted to pivotally connect a third portion of said window longitudinally spaced from said second portion to said window frame when said second pivot is moved to an extended position, a control member rotatably mounted from a neutral position in a clockwise or counterclockwise direction, said control member pivotally mounted on said window, and an actuating linkage mounted in said vehicle body and operatively connected to said first and second pivots, said control member when rotated in a clockwise direction when said window is in a closed position actuating said linkage to extend said first pivot and retract said second pivot to allow for swinging movement of said window from its closed position to an opened position about an axis extending through said connecting means and said first pivot, said control member when rotated in a counterclockwise direction and when said window is in a closed position actuating said linkage to retract said first pivot and extend said second pivot to allow for swinging movement of said window from its closed position to an opened position about an axis extending through said connecting means and said second pivot, and when said control member is in a neutral position said actuating linkage partially extending said first pivot means and said second pivot means when said window is in a closed position to prevent movement of said window from its closed position to an opened position.

3. A vehicle body having a window frame in a wall thereof, a triangular vent window panel mounted in said frame and adapted to be swingable from a closed position to an exhaust or intake opened position with the window held in said frame and extending angularly outwardly from said vehicle body, a channel member attached to the base of said triangular window panel, a first socket in the forward portion of said channel member and a second socket in the rearward portion of said channel member, a connecting means universally connecting the apex of said window panel to said window frame, a movable first pivot pin mounted in said vehicle body and being movable from a retracted position within said vehicle body to an extended position into said first socket of said channel to pivotally connect said window panel to said frame, a movable second pivot pin mounted in said vehicle body and being movable from a retracted position within said vehicle body to an extended position into said second socket to pivotally connect said window to said frame, a control member mounted on said channel member for selective rotation in clockwise or counterclockwise directions, linkage means in said vehicle body operatively connected to said first and second pivot pins, said control member when rotated in one direction and when said window panel is in a closed position actuating said linkage means to extend said first pivot pin into said first socket and to retract said second pivot pin to allow for swinging movement of said window from its closed position to an exhaust opened position about a first axis extending through said connecting means and along said center axis of said first pivot pin, said control member when rotated in an opposite direction and when said window panel is in a closed position actuating said linkage means to retract said first pivot pin and extend said second pivot pin into said second socket to allow for swinging movement of said window from its closed position to an intake opened position about a second axis extending through said connecting means and the center axis of said second pivot pin.

4. The device as described in claim 3 and which is further characterized in that a toggle linkage is provided between said window frame and said channel member to control the maximum angular outward movement of said window panel when the latter is swung to either the exhaust or intake opened position.

5. A vehicle body having a window frame in a wall thereof, a triangular vent window panel mounted in said frame and adapted to be swingable from a closed position to an exhaust or intake opened position with the window held in said frame and extending angularly outwardly from said vehicle body, a channel member attached to the base of said triangular window panel, a first socket in the forward portion of said channel member and a second socket in the rearward portion of said channel member, a connecting means universally connecting the apex of said window panel to said window frame, a control member rotatably mounted on said channel member intermediate said first socket and said second socket, said control member having a handle portion at one end and a cam portion at the other end, said handle portion movable from a neutral position in either a forward direction or a backward direction, an actuating link pivotally mounted in said vehicle body below said window frame, said actuating link having at one end a cam portion engageable means to receive said cam portion of the control member, a coupling link having its center pivotally connected to said vehicle body and one end pivotally connected to the other end of said actuating link, a driving link extending generally longitudinally and adapted to be moved in a fore and aft direction, said driving link having its center portion pivotally connected to the other end of said coupling link, a triangular-shaped first bell crank member having one corner pivotally connected to said vehicle body, a second corner to the forward end of said driving link and a third corner to a shiftable first pivot pin, a triangular-shaped second bell crank member having one corner pivotally connected to said vehicle body, a second corner to the rearward portion of said driving link, and a third corner to a shiftable second pivot pin, said cam portion engaging said cam portion engageable means when said handle portion is swung in a rearward direction from a neutral position to rotate said actuating link in an opposite direction, said rotation of said actuating link causing said coupling link to move said driving link forwardly thereby pivotally swinging said first bell crank member so as to shift said first pivot pin into said first socket and simultaneously pivotally swinging said second bell crank member so as to retract said second pivot pin from said second socket to allow for swinging movement of said window panel from its closed position to an opened exhaust position about an axis extending through said connecting means and said first pivot pin, said cam portion engaging said cam portion engageable means when said handle portion is swung in a forward direction from a neutral position to rotate said actuating link in an opposite direction, rotation of said actuating link causing said coupling link to move said driving link rearwardly thereby pivotally swinging said first bell crank member so as to retract said first pivot pin from said first socket and simultaneously pivotally swinging said second bell crank member so as to shift said second pivot pin into said second socket to allow for swinging movement of said window panel from its closed position to an opened intake position about a second axis extending through said connecting means and said second pivot pin, said handle portion when swung to a neutral position causing the vertical alignment of said actuating link and said coupling link to center said driving link, said centering of said driving link causing said partial pivotal movement of said first bell crank member and said second bell crank member so as to shift said first pivot pin and said second pivot pin into partial engagement with said first socket and said second socket to prevent movement of said window panel from its closed position.

References Cited by the Examiner

UNITED STATES PATENTS

| 331,466 | 12/85 | Whitney | 20—53 |
| 409,634 | 8/89 | Dekalb | 20—53 |

FOREIGN PATENTS

| 440,218 | 12/35 | Great Britain. |
| 835,068 | 5/60 | Great Britain. |
| 919,336 | 10/54 | Germany. |

BENJAMIN HERSH, *Primary Examiner.*

A. HARRY LEVY, MILTON BUCHLER, *Examiners.*